United States Patent [19]

Tsunoda et al.

[11] Patent Number: 4,920,338

[45] Date of Patent: Apr. 24, 1990

[54] AUTOMATIC SEAT POSITIONING DEVICE FOR AUTOMOTIVE VEHICLE AND THE LIKE

[75] Inventors: Masakazu Tsunoda, Fujisawa; Akimitsu Inoue, Toride; Tsutomu Yamamoto, deceased, late of Ibaragi, all of Japan, by Tatsuyo Yamamoto, Hirofumi Yamamoto, Toshifumi Yamamoto, Ikuko Yamamoto, legal representatives

[73] Assignees: Nissan Motor Co., Ltd., Yokohama; Niles Parts Co., Ltd., Tokyo, both of Japan

[21] Appl. No.: 201,995

[22] Filed: Jun. 3, 1988

[30] Foreign Application Priority Data

Jun. 4, 1987 [JP] Japan ................................ 62-139024

[51] Int. Cl.⁵ .......................... H04Q 3/02; B60R 25/04
[52] U.S. Cl. ....................... 340/825.300; 340/825.310; 340/825.320; 318/466
[58] Field of Search ....................... 340/825.31, 825.30, 340/825.52, 825.69, 64, 63, 825.32; 318/568, 466, 103; 235/380, 381, 382, 382.5; 364/424

[56] References Cited

U.S. PATENT DOCUMENTS

| | | | |
|---|---|---|---|
| 4,477,874 | 10/1984 | Ikuta et al. | 364/424 |
| 4,723,121 | 2/1988 | Van der Boom et al. | 340/63 |
| 4,754,255 | 6/1988 | Sanders et al. | 340/64 |
| 4,755,815 | 7/1988 | Savoyet et al. | 340/825.32 |
| 4,833,465 | 5/1989 | Abend et al. | 340/825.31 |

FOREIGN PATENT DOCUMENTS

| | | |
|---|---|---|
| 58-33570 | 8/1981 | Japan . |
| 58-33571 | 8/1981 | Japan . |
| 58-76336 | 10/1981 | Japan . |
| 58-33569 | 2/1983 | Japan . |

*Primary Examiner*—Donald J. Yusko
*Assistant Examiner*—Brian S. Palladino
*Attorney, Agent, or Firm*—Lowe, Price, LeBlanc, Becker & Shur

[57] ABSTRACT

A plurality of engine ignition keys are provided provided with codes which enable each key owner or user to preselect a seat position and automatically achieve the same position upon re-entering the vehicle simply by inserting the key into the engine ignition.

10 Claims, 6 Drawing Sheets

1

AUTOMATIC SEAT POSITIONING DEVICE FOR AUTOMOTIVE VEHICLE AND THE LIKE

BACKGROUND OF THE INVENTION

1. Field of the Invention

The present invention relates generally to vehicles and more specifically to a seat positioning system which will automatically move a predetermined seat such as the drivers's seat to a predetermined position without the need of manual operation of push buttons and the like.

2. Description of the Prior Art

Recently it is has been proposed to provide vehicles with seat positioning control systems which are able to move a driver's seat to one of a plurality of pre-memorized positions. One example of such an arrangement is disclosed in JP-A-58-33569.

Such systems are inevitably provided with a control console via which the seat position and the like can be effected. A console of this nature is shown in FIG. 9. This unit includes a plurality of position selection buttons 1' to 4' the first of which is usually used by the vehicle owner and/or most frequent user of the vehicle; a set button 5' which can be used to set new position data into the memory of the system; a cancel button 6' which can used to clear previously memorized data from the memory of the system, a slide switch 7' which can used to move the seat backwards and forwards in order to achieve a new seat position and a lift switch 8' which can be used to raise and lower the set to achieve a preferred elevation.

However, these systems have suffered from the drawback that the driver once having entered the vehicle is required to manually operate at least one of the buttons or switches on the control console in order to achieve the desired seat position.

SUMMARY OF THE INVENTION

It is an object of the present invention to provide an arrangement which minimizes the number of the operations required by the driver upon entry into a vehicle and which automatically moves the driver's seat to a pre-memorized position without the need to operate push buttons and the like for said purpose.

In brief, the above object is achieved by an arrangement wherein a plurality of engine ignition keys are provided with codes which enable each key owner or user to preselect a seat position and automatically achieve the same position upon re-entering the vehicle simply by inserting the key into the engine ignition.

A first aspect of the present invention takes the form of a system which features a device; a key reader, said key reader being arranged to examine a key and determine the presence of a code element provided on said key, said key reader being arranged to produce a signal indicative of the result of the examination; and a control circuit, said control circuit being responsive to said signal and arranged to produce a control signal, said control circuit being operatively connected with said device in a manner wherein said control signal induces said device to assume a condition which has a predetermined relationship with the result of said examination.

A second aspect of the present invention comes in the form of a vehicle which features a device; a key said key being arranged to operate a switch associated with said vehicle; code means provided on said key; a key reader, said key reader being arranged to read the code on said key and output a signal indicative thereof; and a control circuit, said control circuit including a memory and being responsive to said signal and arranged to produce a control signal, said control circuit being operatively connected with said device in a manner wherein said control signal induces said device to assume a predetermined condition.

Another aspect of the present invention comes in the form of a vehicle which includes a device; a plurality of keys, each of said keys being arranged to operate a switch associated with said vehicle; a plurality of codes, each of said codes being disposed on one of said plurality of keys; a key reader, said key reader being arranged to read the code on the key used to operate said switch, and output a signal indicative thereof; a control circuit, said control circuit including a memory in which a plurality of different data is retained, each of said plurality of data having a predetermined relationship with one of said plurality of codes, said control circuit being responsive to said signal and arranged to produce a control signal based on the data which corresponds to the code which is read by said key reader, said control circuit being operatively connected with said device in a manner wherein said control signal induces said device to assume a condition which has a predetermined relationship with the code read by said key reader.

A further aspect of the invention takes the form of a vehicle which is provided with a seat; a plurality of keys, each of said keys being arranged to operate an engine ignition switch; a plurality of codes, each of said codes being disposed on one of said plurality of keys; a key reader, said key reader being arranged to read the code on the key used to operate said ignition switch and output a signal indicative thereof; a control circuit, said control circuit including a memory in which a plurality of different seat position data is retained, each of said plurality of seat position data having a predetermined relationship with one of said plurality of codes, said control circuit being responsive to said signal and arranged to produce a control signal based on the data which corresponds to the code which is read by said key reader, said control circuit being operatively connected with a seat servo mechanism in a manner wherein said control signal induces said servo mechanism to move said seat to position which has a predetermined relationship with the code read by said key reader.

DESCRIPTION OF THE PREFERRED EMBODIMENTS

Figure 1:
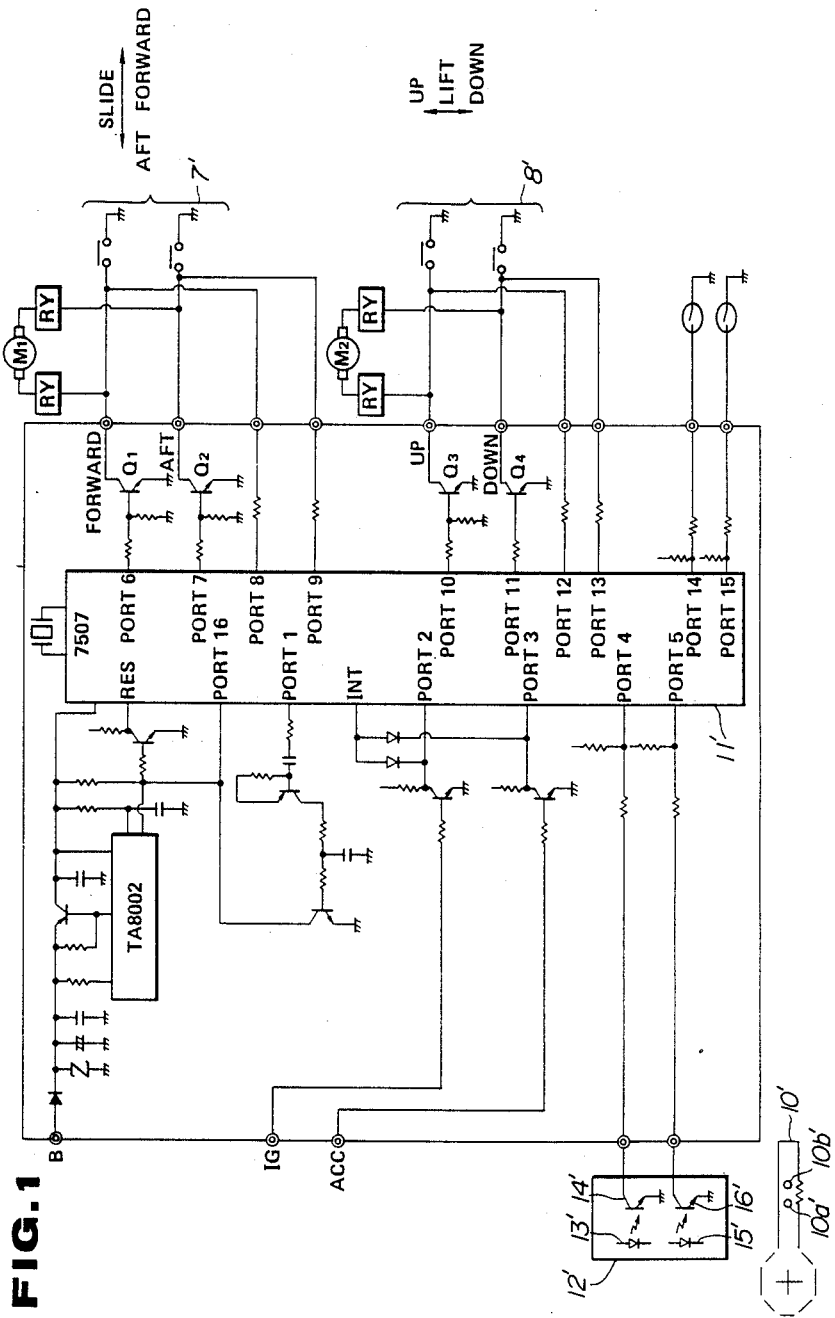
FIG. 1 is a circuit diagram showing an arrangement which characterizes a first embodiment of the present invention.

FIG. 1 shows a circuit arrangement which is used in a first embodiment of the present invention. In this arrangement an ignition key 10' is provided with discrimination code elements 10a' and 10b'.

In the instant embodiment these discrimination code elements may comprises first and second through holes, magnets and the like. It is further possible to add slide resistances in a suitable manner if so desired.

In accordance with the first embodiment it is possible to prepare four different code element combinations and thus allow four different keys to be produced. When one of the keys is inserted into the ignition switch it is possible to automatically identify from the code elements which of four pre-memorized seat positions is required and automatically adjust the seat to the key owners preferred position and height.

In the case of the through hole type code elements a key reader 12' is provided with light emitting diodes 13' and 15' and corresponding phototransistors 14' and 16' are used to read the code elements 10a' and 10b' respectively. For example the vehicle owners key may be equipped with both code elements 10a' and 10b'. In this instance the light emitted from the light emitting diodes 13' and 15' will be transmitted to the phototransistors 14' and 15'. The second key may have only code element 10a in which case the light from light emitting diode 15' will not be transmitted to the phototransistor 16'.

The third key may have only code element 10b' while the fourth key will be devoid of elements.

As will be appreciated from FIG. 1 when both of the code elements are provided both of the phototransistors 14' and 16' will be rendered conductive and due to the grounding accordingly provided, the signals appearing on ports 4 and 5 of the control circuit 11' will fall to a low level.

The control circuit 11' in this embodiment forms part of a microprocessor which includes a memory arrangement capable of memorizing four different sets of position data and which is capable of selectively outputting control signal in manner to achieve the selected on of the memory sets. For example, in the case that ports 4 and 5 are induced to simultaneously assume low levels, signal appropriate to achieving the seat position denoted by this combination, the level of the signals appearing at ports 6, 7, 10 and 11 are selectively controlled in a manner which achieves the same.

That is to say, when a high level signal appears on port 6, transistor Q1 is rendered conductive and a rely RY of seat slide motor M1 is connected to ground. This permits current to flow through the motor M1 in a manner which energizes the same and moves the seat in the forward direction.

On the other hand, in the event that a high level signal is induced to appear on port 7, transistor Q2 is rendered conductive and the seat slide motor M1 is energized in a manner which drives the seat toward its most rearward of aft position.

When a high level signal appears on port 10, as the gate of transistor Q3 is connected to the same it is rendered conductive.

Under these circumstances a motor M2 which forms part of a seat lift control arrangement is energized in a manner which induces the seat to be elevatated. Conversely, when a high level signal appears on port 11, transistor Q4 is rendered conductive in manner which energizes the seat lift motor M2 in a manner which lowers the seat with respect to the vehicle chassis on which it is supported.

Figure 11:
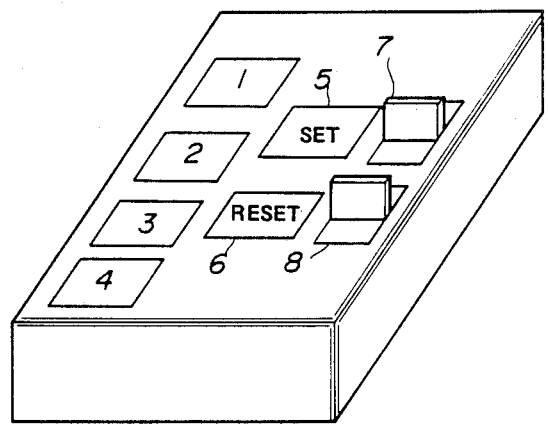
FIG. 11 is a perspective view showing a push button control console arrangement of the type discussed in the opening paragraphs of the instant disclosure.

Ports 8, 9, 12 and 13 are respectively seat position data input ports which are arranged to be responsive to the operation of the seat slide control switch 7' and the seat lift control switch 8' on the control console shown in FIG. 11. In this instance, whenever one of the switches 8' and 9' are operated to ground one of the RY circuits in manner which permits motor operation, the grounding will effect the level of the signal appearing on respective data input port. Accordingly, whenever one of these ports is grounded the control circuit is informed that the seat is being moved (forward or backward) under manual control and is thus able to monitor the movement.

Similarly, when port 12 is grounded by the operation of the lift control switch 9' the seat is lifted by the operation of the lift motor M2. Conversely, when port 13 is grounded the seat is lowered by the reverse operation of motor M2. The level of the signal appearing on ports 12 and 13 is thus indicative of the seat height being subject to manual control and enables the control circuit to monitor the changes induced thereby.

Figure 5:
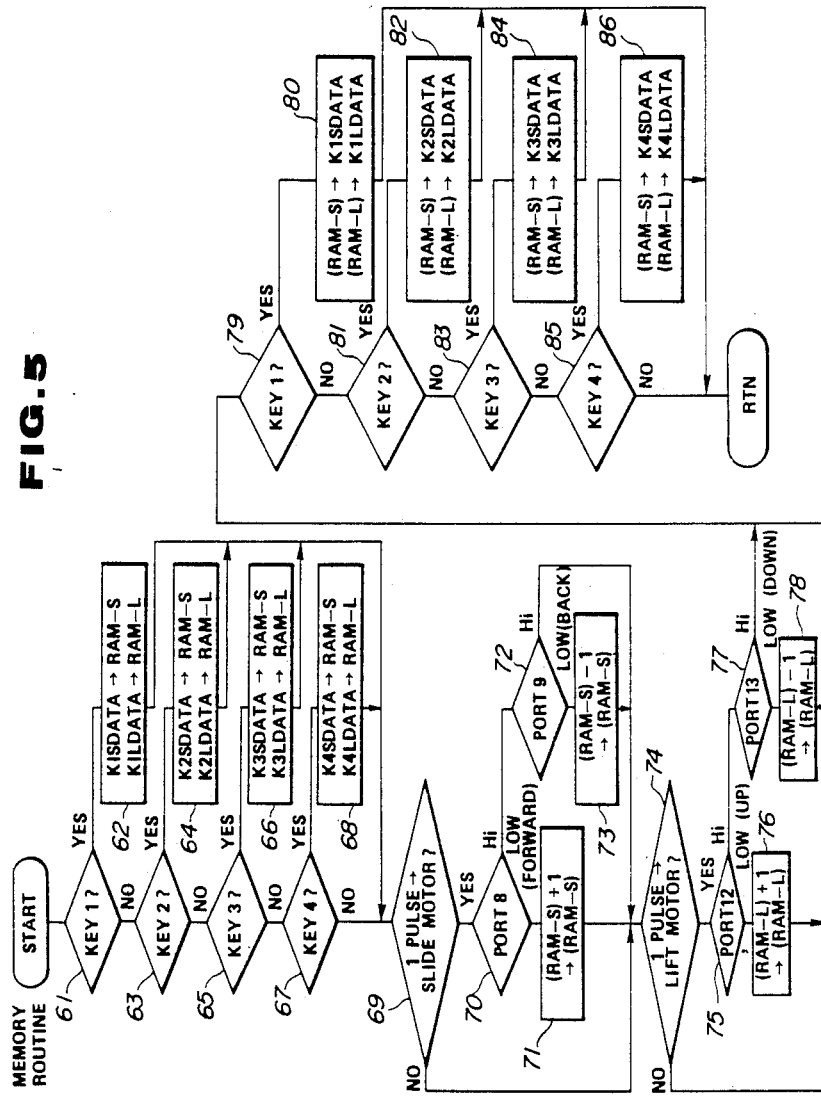

These features will become more clearly appreciated from the disclosure of the operations depicted in the flow chart shown in FIG. 5, which is set forth hereinlater.

Figure 2:
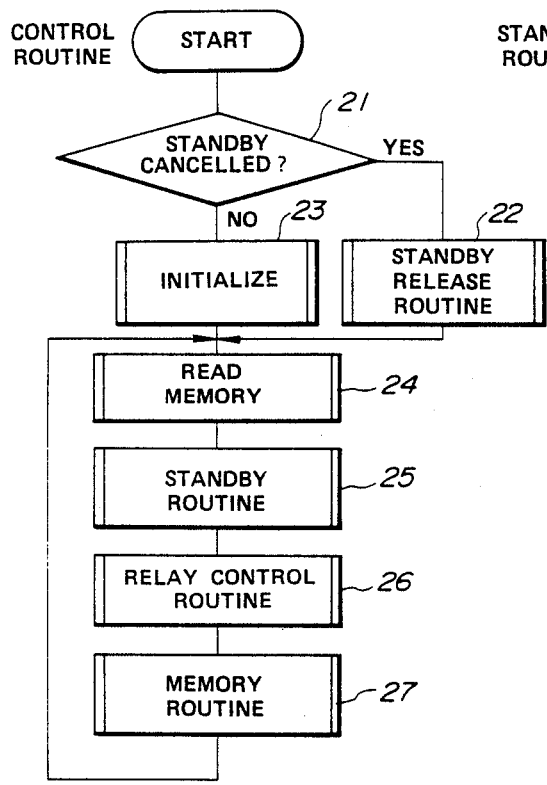
FIGS. 2 to 5 show flow charts which depict the characteristic operations performed in conjunction with the operation of the first embodiment.

FIG. 2 shows a main control routine which is run in the microprocessor mentioned above. The first step (step 21) of this routine is such as to determine if the running of a stand by routine (disclosed hereinlater with reference to FIG. 3) has been released or not. In the event of a positive outcome the program flows to step 22 wherein the slide position data SBAFF and the lift position data LBAFF which was used at the time of the last standby return are established.

On the other hand, in the event of a negative outcome at step 21 then at step 23 the system is initialized and at step 24 the previously recorded seat position data for each of the plurality of key codes is recalled from memory.

At steps 25, 26 and 27 a standby routine, a relay control and memory routine are respectively run.

Figure 3:
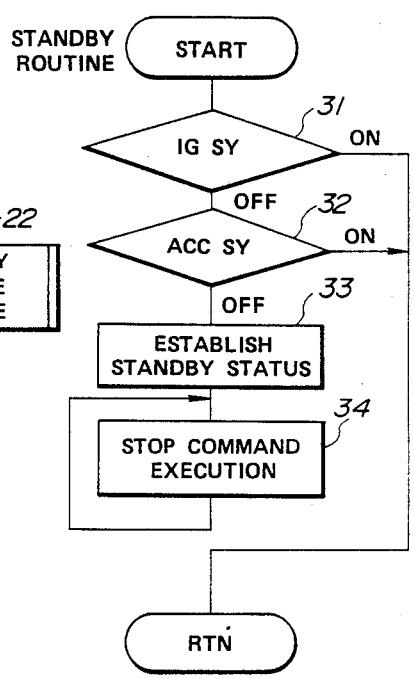

FIG. 3 shows the steps which characterize the above mentioned standby routine. As shown, the first steps (steps 31, 32) of this routine are such as to read the instant status of the engine ignition switch IG and the accessory control switch ACC. In the event that both of these switches are found to be OFF the program flows to step 33 wherein a standby status establishing routine is run. This latter mentioned routine consists of inducing the signals appearing on ports 6, 7, 11 and 13 to assume low levels. This of course ensures that transistors Q1–Q4 are conditioned to assume a non-conductive state and that the operation of the motors M1 and M2 by the control circuit 11 is prevented. It should again be noted that the motor M1 and M2 can be manually controlled by the operation of switches 7' and 8'. Viz., by selective operation of the above mentioned switches which are provided on a control console of the nature shown in FIG. 11 the relays RY of the two motors can be gounded in a manner which induces the appropriate rotation thereof.

Following the execution of step 33 the program flows to step 34 wherein a command is issued which prevents the implementation of further commands and assumes a closed loop.

Figure 4:
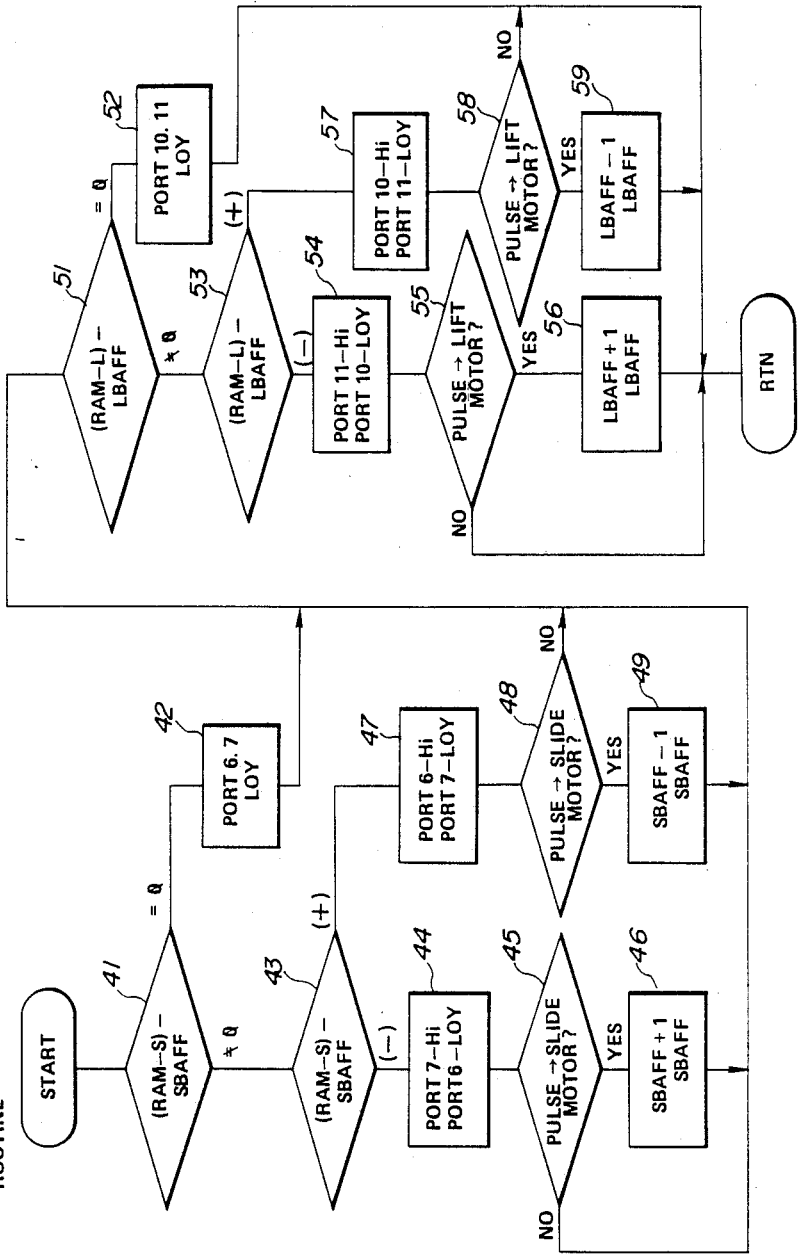

FIG. 4 shows the steps which characterize the above mentioned relay control routine. In step 41 of this program the previously required seat slide position data and the actual slide position data at the last return of the standby routine are compared. In the event that the comparison indicates that the two values are the same (viz., there is no difference) the program flows to step 42 wherein commands are issued to set the levels of ports 6 and 7 to low levels are issued. On the other hand, in the event that there is a difference between the values compared in step 41 then at step 43 it is determined if the difference between the two values is positive or negative. In the event that the difference is positive (in this case indicating that the seat needs to move forward) then the program flows to step 47 wherein commands are issued which induces the signal appearing on port 6 to assume a high level and that appearing on port 7 to assume a low one. This of course induces the grounding of the slide motor M1 through transistor Q1 and permits the seat to be moved forward. On the other hand, in the event that the difference between the two values compared in step 41 is negative, the program flows to step 44 wherein commands are issued to induce a high level signal on port 7 and low one on port 6. This induces the rotation of the seat slide motor M1 but in a direction which moves the seat to the rear or aft of the vehicle.

At steps 45 and 48 it is determined if the seat slide motor M1 has been supplied with a predetermined amount or one pulse of power.

When such an amount of power has been supplied to the Motor M1 then at steps 46 or 49 (depending on the direction in which the motor is being rotated) the SBAFF data is incrementally increased or decreased as the case demands.

At step 51 the previous set seat lift position data and the position data at the last return of the standby routine are compared.

In the event that the two positions coincide the program flows to step 52 wherein both ports 10 and 11 are set to low levels. However, in the event of a difference existing the program flows to step 53 wherein the difference is analysed in a manner similar to the performed in step 43 and determines if the difference is positive (indicative that the seat should be elevated) or negative (indicative that the seat should be lowered). In the event that the difference is positive, then the program flows to step 57 wherein commands are issued to set port 10 to high level and port 11 to low level are issued. This of course conditions the system to ground the seat lift motor M2 through transistor Q3 and induce the motor to rotate in a direction which will lift the seat. At step 58 the amount of power (viz., 1 pulse) which has been permitted to flow through the motor is checked. Until one pulse has been supplied to the motor M2 the program returns. However, when it is indicated that one pulse has been supplied to the motor the program flow to step 59 wherein the LBAFF data is incrementally decreased by one.

Steps 54 to 56 perform similar operations to steps 57 to 59 but induce the lowering of the seat.

FIG. 5 shows the steps which characterize the above mentioned memory routine.

Steps 61, 63, 65, 67 of this routine are such as to sample the output of the key reader 12 and determine which of the four keys has been inserted into the engine ignition.

Depending of the selected key the pre-recorded data which corresponds to the position selected for instant key is set into memory. For example, if the first key (key 1) is determined to have been inserted K1S and K1L data are set into RAM-S and RAM-L respectively. In the instant arrangement the above mentioned data will take the form of counts which are used in conjunction with the SBAFF and LBAFF values used in steps 41 and 51 of the relay control routine.

As will be appreciated, by using a count technique it is possible to keep track of the seat slide and lift positions without the need for hardware (sensors) for said purpose.

At step 69 the operation of the slide motor M1 is monitored and the determination made as to whether the motor is running and whether one pulse of power have been supplied thereto. In the event of a negative outcome, the program flows to step 74. However, in the event that a full pulse has been supplied the program flows to step 70 wherein it is determined if port 8 has assumed a low level or not.

It will be appreciated that this section of the program deals with the situation wherein the operation of the seat slide motor has been induced via manual operation of the slide control switch 7' provided on the control console of FIG. 11. Viz., in the event that port 8 has assumed a low level it can be assumed that switch 7' has been closed by manual operation and has induced the grouding of port 8. On the other hand, if port 9 has assumed a low level it is assumed that the slide control switch 7' has been operated in a manner to induce the rearward movement of the seat.

At step 71 the slide position count data stored in the RAM-S is updated by incrementally increasing the same by 1. This, thus, reflects the completion of the motor operation sensed in step 69.

However, in the event that port 8 is at a high level the program flows to step 72 to check if the motor operation discovered in step 69 is due to the operation of the seat slide control switch 7' for the purposes of the moving the seat to a new position. While port 9 is at a high level the program by-passes step 73 and goes directly to step 74. However, if the level of portion 9 is low then the count data in the RAM-S is updated by an incremental reduction to take into account the completed operation (e.g. one step of a stepping motor) of the seat slide motor M1.

At step 74 the operation of the seat lift motor M2 is monitored and the determination made as to whether one full predetermined amount of operation of the motor has been completed or not. This is determined by ascertaining if one full pulse has been applied thereto or not.

In the event of a negative outcome, it is assumed that the motor is in mid operation and the program flows to steps 79 to 86 wherein the key which is instantly being used is re-checked and the appropriate position data read of RAM.

However, if the outcome of the enquiry conducted at step 74 is positive then at step the status of ports 12 and 13 are appropriately checke. Viz., if port 12 is at a low level then it is taken that the seat lift control switch 8' is being manually operated in manner which induces the seat to rise up. Conversely, if port 13 has been induced to assume a low level then it is deemed that switch 8' has been manipulated to lower the seat. Steps 76 and 78 are such as to update the new set lift position count data in RAM-L in accordance with the just completed motor operation. FIGS. 6 to 9 show arrangements which characterize a second embodiment of the present invention. In accordance with this embodiment only one positional code 10a" is provided in each of the keys 10" and the key reader 12" is such as to include only a single light emitting diode 13" and one phototransistor 14".

When phototransistor 14 is rendered conductive, such as due to the insertion of a key equipped with the appropriate code element 10a", a terminal P3 of an analog multiplexer 101 is caused to assume a low level. This induces the situation wherein a coil C1 forming part of memory switch S1 is caused to assume a non-energized and therefore "non-magnetizing" state. Simultaneously, a terminal P6 of an analog multiplexer 102 is also grounded and induced to assume a low level. This renders a transistor which is arranged between the terminal P6 and a coil C2 of a second memory switch S2 non-conductive and thus causes the coil to assume a non-energized/magnetizing state.

Figure 7:
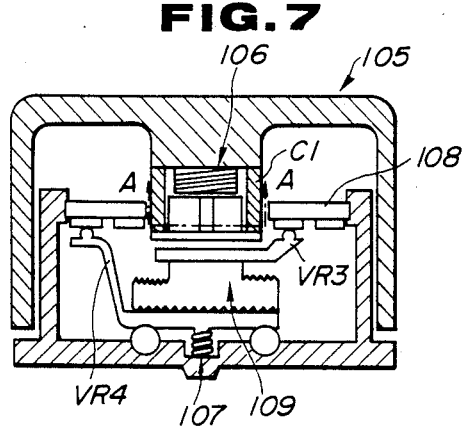
FIGS. 7-9 are sectional and perspective views showing the construction of a memory switch utilized in the embodiment shown in FIG. 6.
Figure 8:
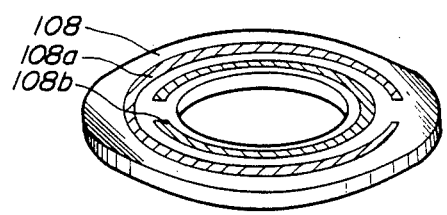
Figure 9:
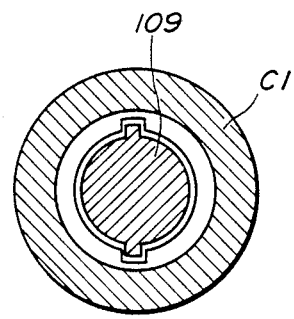

FIG. 7 shows in sectional elevation the construction of the memory switch S1 while FIG. 8 shows a perspective view of a base plate 108 which forms part of the device shown in FIG. 7 and FIG..9 shows in sectional plan view of portion of the FIG. 7 device as taken along section line A—A. It will be noted that the construction of memory switch S2 is essentially the same as that of S1 and that a description of the same will be omitted for brevity.

In the arrangement illustrated in FIG. 7 an iron core member 109 is arranged to be subject to a constant bias by a spring 106 and to a bias produced by the above mentioned coil C1 when energized. As shown, the spring 106 is arranged to bias the core member 109 downwardly while the coil C1 is de-energized to establish a drive connection with an element to which contact elements VR3 and VR4 are connected and thus induce the situation wherein when the cap-like member 105 is rotated the contact elements VR3 and VR4 induced to rotate synchronously therewith. To ensure a positive connection the core member is provide with intergal key members along the side thereof. These key members engage corresponding key slots in the manner illustrated in FIG. 9.

The VR3 and VR4 contact electrodes which are biased in the direction in which the coil is arranged to produce an attractive force and establish a single point connection with corresponding conductive elements 108a and 108b formed in the stationary annular member 108.

The combination of the contact elements VR3, VR4 and the conductive elements 108a and 108b define variable resistor arrangements which undergo a change in resistance when the cap-like element 105 is rotated.

Figure 6:
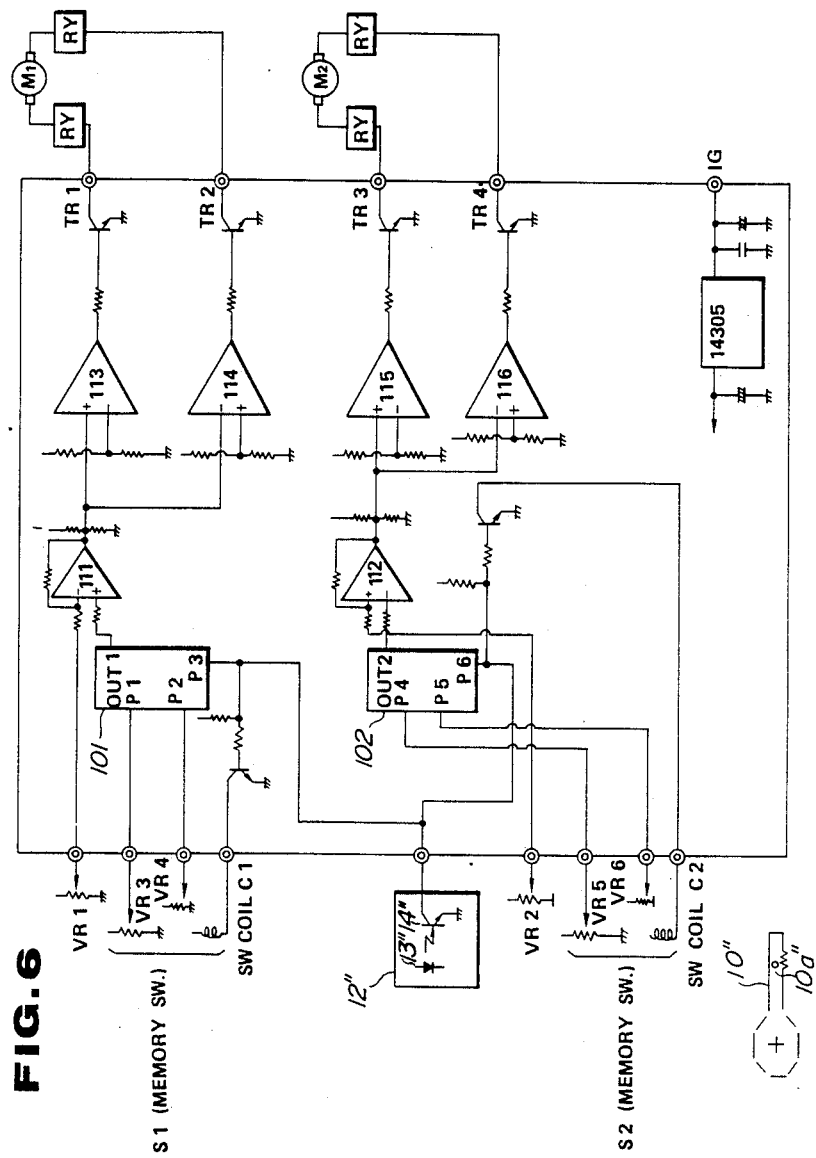
FIG. 6 is a circuit diagram showing an arrangement which characterizes a second embodiment of the present invention.
Figure 10:
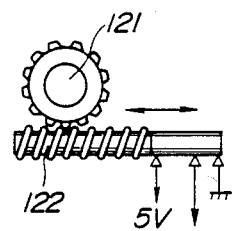
FIG. 10 is an elevation of a variable resistor which is used in the lift and slide motors used in the embodiment of FIG. 6.

In order to keep track of the position of the seat in the slide and lift directions each of the motors associated with the just mentioned controls are arranged to be operatively connected with variable resistors VR1 and VR2 (see FIG. 6). An example of the construction of these variable resistance arrangements is nature shown in FIG. 10. In this figure, the numeral 121 denotes a motor output shaft while 122 denotes a gear operatively connected to the output shaft in manner to move axially in response to motor rotation. The gear is operatively connected with a variable resistance arrangement the output signal of which varies with the amount of axial displacement of the gear element 122. With this arrangement the instant embodiment utilizes the level of the variable resistor output to ascertain the position of the seat in lieu of the counting technique employed in the first embodiment.

Turning again to FIG. 6 when the level of the signal appearing on terminal P3 of the analog multiplexer 101 assumes a low level the voltage appearing on the contact VR3 is applied to the OUT 1 terminal thereof. At the same time as the level of the signal appearing on the terminal P6 of memory switch S2 assumes a low level the voltage appearing on the terminal VR5 is applied to the OUT 2 electrode of the analog multiplexer 102.

The circuit arrangement shown in FIG. 6 further includes a first differential amplifier 111 the negative input of which is connected with the variable resistor VR1 while the positive input is connected with the OUT 1 terminal of the analog multiplexer 101. With this arrangement when the difference between the signals applied to the positive and negative inputs is zero the differential amplifier 111 is, in this instance, constructed in a manner to output a 2.5 volt signal. When the value of the resistance of VR1 increases the output of the amplifier falls below the predetermined voltage.

A second differential amplifier 112 is arranged so that the negative terminal thereof is connected with the variable resistor VR2 while the positive terminal is connected with the OUT 2 terminal of the analog multiplexer 102. This amplifier 112 is arranged so that when the difference between the input levels becomes zero the device outputs a 2.5 volt signal and so that when the value of the resistance VR2 increases the voltage output reduces.

Comparators 113, 114, 115 and 116 are respectively arranged so that the outputs thereof are applied to transistors TR1, TR2, TR3 and TR4. As will be appreciated when transistor TR1 is rendered conductive by the output from comparator 113, the seat slide motor M1 is arranged to be moved in the forward direction, while in the case that transistor TR2 is rendered conductive the motor M1 is rotated in the reverse direction which moves the seat toward the rear of the vehicle.

Similarly, transistors TR3 and TR4 are such to control the raising the lowering of the seat in response to outputs from the comparators 115 and 116.

The voltage dividing resistors associated with the comparators 113–116 are arranged so that when the voltage outputs of the differential amplifiers 111 and 112 exceed 2.5 volts the comparators 113 and 115 are induced to produce outputs and render transistors TR1 and TR3 conductive. On the other hand when the voltage outputs of the amplifiers 111 and 112 are below 2.5 volts the comparators 114 and 116 are induced to produce outputs which render transistors TR2 and TR4 conductive.

In other words the arrangement is such that while the voltage outputs of the two differential amplifiers remain at the preselected levels, neither of the motors M1 and M2 are energized, while in the event of a shift in voltage the motors are selectively energized.

As will be appreciated it is within the scope of the present invention to increase the number of code elements in the key 10" and modify the circuit arrangement of the second embodiment in a manner which allows for more than one preselected set of seat slide and height positions if so desired.

As will be further appreciated, when a key which is not provided with the appropriate code element is inserted into the ignition, the coils 106 in the memory switches S1 and S2 are not grounded and retract the core elements 109 in a manner which renders it impossible for the rotation of the cap elements 105 to change the settings of the contacts VR3 & VR4 and VR5 & VR6 in the memory switches S1 and S2.

Accordingly, on the person possessing the coded key is able to set the memory switches.

The present invention is not limited to the two embodiments disclosed hereinbefore and various modifications can be made without departing from the scope of the present invention.

What is claimed is:

1. In an automotive vehicle having a seat, a seat position control arrangement comprising:
    a key, said key having a blade portion which can be inserted into an engine ignition switch;
    a key reader, said key reader being disposed with said ignition switch, said key reader comprising:
    a light emitting diode; and
    a phototransistor;
    said phototransistor being disposed opposite said light emitting diode and arranged to rendered conductive by light emitted from said light emitting diode, said phototransistor and said light emitting diode being arranged so that the blade of said key can be interposed therebetween;
    a code defined in said key blade, said code comprising the selective provision of a through hole which permits light from said light emitting diode to pass through said key to said phototransistor;
    first and second ;motors for adjusting first and second positions of the seat;
    first and second seat position control switches for determining the first and second positions of the seat; and
    a control circuit, said control circuit being operatively connected with
    said first and second motors, said first and second seat position control switches, said ignition switch and said phototransistor, said control circuit comprising:
    memory means for memorizing the first and second positions selected via operation of said first and second seat position control switches, and
    circuit means operatively connected with and responsive to said memory means, for selectively energizing said first and second motors in response to the state of conductivity of said phototransistor.

2. A seat position control arrangement as claimed in claim 1 wherein said control circuit comprises a microprocessor and wherein the phototransistor of said key reader is connected with a port of the microprocessor in a manner to ground the port when said phototransistor is rendered conductive.

3. A seat position control arrangement as claimed in claim 1 wherein each of said first and second seat position control switches includes:
    a manually operable member;
    first and second variable resistors, said first and second variable resistors being connected with said manually operative member by way of a connection means which comprises an electromagnetic coil and a spring, said connection means providing a drive connection between said manually operable member and said first and second variable resistors when said coil is de-energized and wherein
    said control circuit includes circuitry which is operatively connected with said first and second seat position control switches and which is responsive to the conductivity of the phototransistor in said key reader, in a manner wherein, when said phototransistor is rendered conductive, the coils in said first and second seat position control switches are de-energized.

4. A seat position control arrangement as claimed in claim 1 wherein said control circuit comprises:
    first and second analog multiplexers, said first and second multiplexers each having first, second and third ports, the first ports of said first and second multiplexers being connected with said key reader, said second and third ports of said first and second multiplexers being connected respectively with the first and second variable resistors of said first and second seat position control switches;
    third and fourth variable resistors;
    first and second differential amplifiers, said first and differential amplifier being connected with an output port of said first multiplexer and said third variable resistor, said second differential amplifier being connected with an output port of said second multiplexer and said fourth variable resistor;
    first and second comparators, said first and second comparators being connected between said first differential amplifier and said first motor; and
    third and fourth comparators, said third and fourth comparators being connected between said second differential amplifier and said second motor.

5. In an automotive vehicle having a seat, a seat position control arrangement comprising:
    an engine ignition switch;
    a key reader, said key reader being disposed with said ignition switch, said key reader comprising:
    a light emitting diode; and
    a phototransistor;
    said phototransistor being disposed opposite said light emitting diode and arranged to render conductive by light emitted from said light emitting diode, said phototransistor and said light emitting diode being arranged so that the blade of a key can be interposed therebetween;
    first and second motors for adjusting first and second positions of the seat;
    first and second seat position control switches for determining the first and second positions of the seat;
    a control circuit, said control circuit being operatively connected with
    said first and second motors, said first and second seat position control switches, said ignition switch and said phototransistor, said control circuit comprising:
    memory means for memorizing the first and second positions selected via operation of said first and second seat position control switches, and
    circuit means operatively connected with and responsive to said memory means, for selectively energizing said first and second motors in response to the state of conductivity of said phototransistor;
    a first key, said first key having a blade which can be inserted into said ignition switch and interposed between said phototransistor and said light emitting diode;

a first code defined in the blade of said first key, said code comprising the selective provision of a through hole which permits light from said light emitting diode to pass through said first key to said phototransistor and render the phototransistor conductive;

a second key, said second key having a blade which can be inserted into said ignition switch and interposed between said phototransistor and said light emitting diode; and a second code defined in the blade of said second key, said code comprising the selective omission of a through hole which permits light from said light emitting diode to pass through said second key to said phototransistor, said second code preventing said phototransistor being rendered conductive by the light emitted by said light emitting diode.

6. In an automotive vehicle having a seat, a seat position control arrangement comprising:

an engine ignition switch;

a key reader, said key reader being disposed with said ignition switch, said key reader comprising:

first and second light emitting diodes; and first and second phototransistors;

said first and second phototransistors being disposed opposite said first and second light emitting diodes respectively, said first and second phototransistors being arranged to render conductive by light emitted from said first and second light emitting diodes respectively, said first and second phototransistors and said first and second light emitting diodes being arranged so that the blade of a key can be interposed between said first light emitting diode and said first phototransistor and between said second light emitting diode and said second phototransistor;

first and second motors for adjusting first and second positions of the seat;

first and second seat position control switches for determining the first and second positions of the seat;

a control circuit, said control circuit being operatively connected with said first and second motors, said first and second seat position control switches, said ignition switch, said first phototransistor and said second phototransistor, said control circuit comprising:

memory means for memorizing the first and second positions selected via operation of said first and second seat position control switches, and circuit means operatively connected with and responsive to said memory means, for selectively energizing said first and second motors in response to the conductivity of said first and second phototransistors;

a first key, said first key having a blade which can be inserted into said ignition switch and interposed between said first and second phototransistors and said first and second light emitting diodes;

a first code defined in the blade of said first key, said code comprising the selective provision of a first through hole which permits light from said first light emitting diode to pass through said first key to said first phototransistor and render the first phototransistor conductive;

a second key, said second key having a blade which can be inserted into said ignition switch and interposed between said first and second phototransistors and said first and second light emitting diodes;

a second code defined in the blade of said second key, said code comprising the selective provision of a second through hold which permits light from said second light diode to pass through said second key to said second phototransistor and render the second phototransistor conductive;

a third key, said third key having a blade which can be inserted into said ignition switch and interposed between said first and second phototransistors and said first and second light emitting diodes;

a third code defined in the blade of said third key, said code comprising the selective provision of the first through hole which permits light from said first light emitting diode to pass through said third key to said first phototransistor and render the first phototransistor conductive, and the second through hole which permits light from said second light emitting diode to pass through said third key to said second phototransistor and render the second phototransistor conductive; and a fourth key, said fourth key having a blade which can be inserted into said ignition switch and interposed between said phototransistor and said light emitting diode; and a fourth code defined in the blade of said fourth key, said code comprising the selective omission of the first and second through holes which permits light from said first and second light emitting diodes to pass through said fourth key to said first and second phototransistors, said fourth code preventing said first and second phototransistors being rendered conductive by the light emitted by said first and second light emitting diodes.

7. In an automotive vehicle having a seat, a seat position control arrangement comprising:

an ignition key having a blade portion which can be inserted into an engine ignition switch;

a key reader disposed with said ignition switch, said key reader including (a) a light emitting diode positioned to illuminate a predetermined portion of said ignition key blade and (b) a phototransistor disposed to receive light from said light emitting diode by way of said predetermined portion of said ignition key blade in response to a first optical characteristic of said predetermined portion of said ignition key blade, light from said light emitting diode being inhibited from being received by said phototransistor in response to a second optical characteristic of said ignition key blade, said phototransistor rendered conductive by receipt of light emitted from said light emitting diode;

a code defined in said key blade for identifying said ignition key, said code comprising the selective provision of said first and second optical characteristics along said predetermined portion of said ignition key blade;

first and second motors for adjusting first and second positions of the seat;

first and second seat position control switches for determining the first and second positions of the seat; and a control circuit, said control circuit being operatively connected with said first and second motors, said first and second seat position control switches, said ignition switch and said phototransistor, said control circuit comprising:

(a) memory means for storing the first and second positions selected via operation of said first and second seat position control switches, and
(b) circuit means operatively connected with and responsive to said memory means, for selectively energizing said first and second motors in response to the state of conductivity of said phototransistor.

8. A seat position control arrangement as claimed in claim 7 wherein said control circuit comprises a microprocessor and wherein the phototransistor of said key reader is connected with a port of the microprocessor in a manner to ground the port when said phototransistor is rendered conductive.

9. A seat position control arrangement as claimed in claim 7 wherein each of said first and second seat position control switches includes:
a manually operable member;
first and second variable resistors, said first and second variable resistors being connected with said manually operative member by way of a connection means which comprises an electromagnetic coil and a spring, said connection means providing a drive connection between said manually operable member and said first and second variable resistors when said coil is de-energized and wherein
said control circuit includes circuitry which is operatively connected with said first and second seat position control switches and which is responsive to the conductivity of the phototransistor in said key reader, in a manner wherein, when said phototransistor is rendered conductive, the coils in said first and second seat position control switches are de-energized.

10. A seat position control arrangement as claimed in claim 7 wherein said control circuit comprises:
first and second analog multiplexers, said first and second multiplexers each having first, second and third ports, the first ports of said first and second multiplexers being connected with said key reader, said second and third ports of said first and second multiplexers being connected respectively with the first and second variable resistors of said first and second seat position control switches;
third and fourth variable resistors;
first and second differential amplifiers, said first and differential amplifier being connected with an output port of said first multiplexer and said third variable resistor, said second differential amplifier being connected with an output port of said second multiplexer and said fourth variable resistor;
first and second comparators, said first and second comparators being connected between said first differential amplifier and said first motor; and
third and fourth comparators, said third and fourth comparators being connected between said second differential amplifier and said second motor.

* * * * *